United States Patent [19]

Coleman et al.

[11] 4,128,827
[45] Dec. 5, 1978

[54] TRAVEL ALARM SYSTEM

[75] Inventors: Donald F. Coleman, Dunlap; Sammy J. Rhodes, Aurora, both of Ill.

[73] Assignee: Caterpillar Tractor Co., Peoria, Ill.

[21] Appl. No.: 785,797

[22] Filed: Apr. 8, 1977

[51] Int. Cl.² .................................................. B60Q 5/00
[52] U.S. Cl. .................................. 340/52 R; 307/10 R; 340/70; 340/377; 340/384 E; 340/527
[58] Field of Search ................... 340/52 R, 56, 62, 63, 340/66, 70, 274 R, 283, 271, 377, 384 R, 384 E, 213 R, 500, 527, 540, 672; 307/10 R

[56] References Cited

U.S. PATENT DOCUMENTS

| | | | |
|---|---|---|---|
| 3,439,324 | 4/1969 | Kirimoto et al. | 340/70 |
| 3,569,927 | 3/1971 | Guyton et al. | 340/56 |
| 3,728,676 | 4/1973 | Brown | 340/70 |
| 3,739,367 | 6/1973 | Fathauer | 340/271 |
| 3,827,024 | 7/1974 | Anderson et al. | 340/70 |

Primary Examiner—John W. Caldwell, Sr.
Assistant Examiner—Joseph E. Nowicki
Attorney, Agent, or Firm—John W. Grant

[57] ABSTRACT

A switch connected to a power source is closed automatically in response to a vehicle being conditioned for travel and is opened in response to the vehicle being stopped. First and second apparatuses deliver first and second electrical signals, respectively, to a switching device in response to the switch being closed. The switching device is rendered conductive for connecting the power source to an alarm for energizing the alarm when either one or both of the first and second signals is delivered thereto. The switching device is rendered nonconductive for deenergizing the alarm in response to neither of the signals being present. A timer stops delivery of the first signal to the switching device only after the first signal has been delivered to the switching device for a predetermined period of time. A manual override is provided for manually selectively stopping delivery of the second signal to the switching device.

14 Claims, 1 Drawing Figure

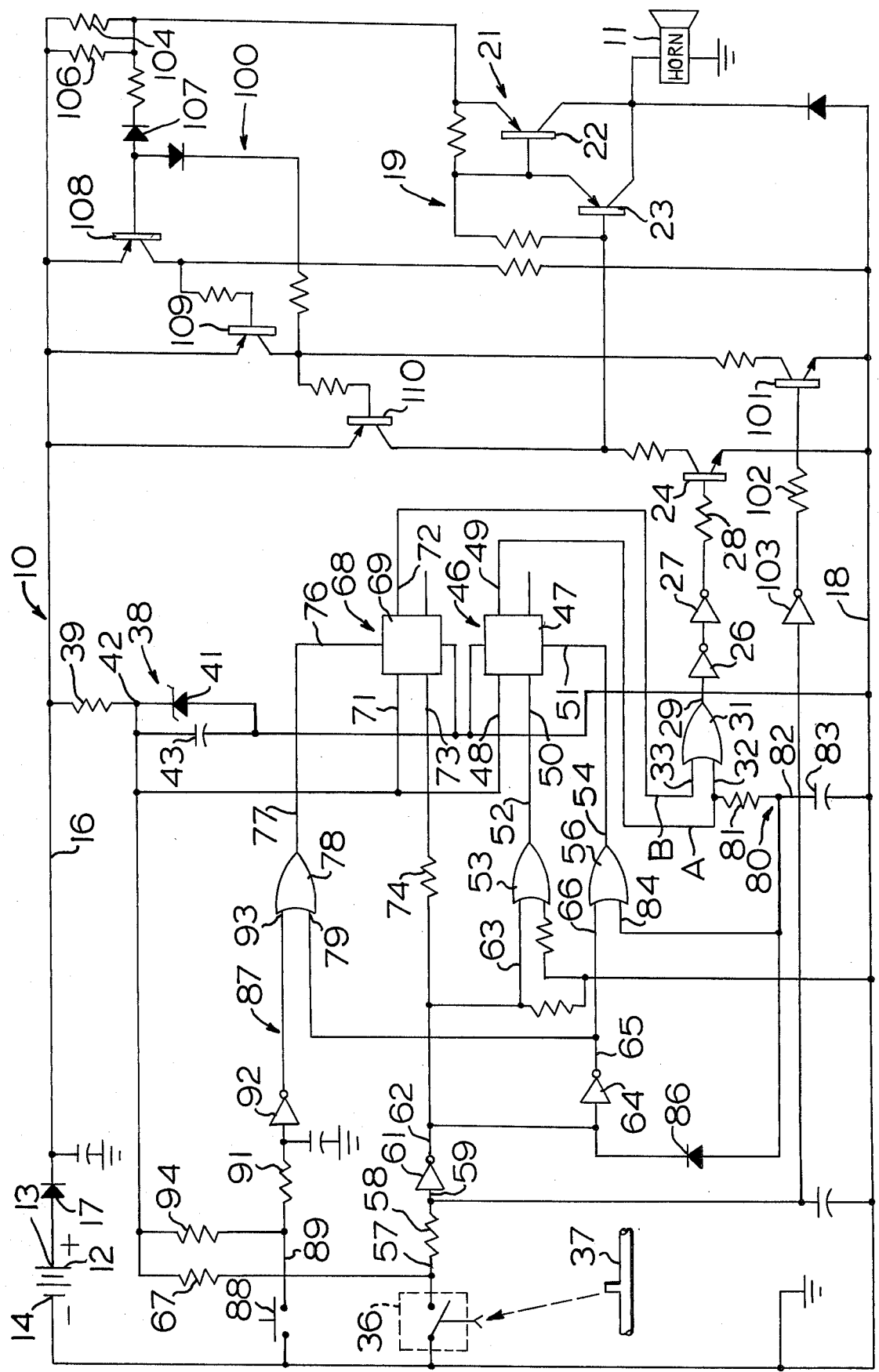

TRAVEL ALARM SYSTEM

BACKGROUND OF THE INVENTION

Due to limited operator visibility toward the rear of many vehicles, audible back-up alarms are often provided to warn personnel in the area that the vehicle is moving backward. However, some vehicles, such as hydraulic excavators, have upper units which can be rotated 360° so that the position of the upper unit with respect to the lower unit may be in any orientation such that the operator's visibility toward the direction of machine motion may be limited or obscured. Thus, on those vehicles, it is desirable to have an audible alarm when the vehicle starts to move in either direction. It is also desirable that such an audible alarm be activated automatically immediately upon the vehicle being put in condition for movement in either direction such as when the vehicle brakes are released or the vehicle power train is shifted from the neutral position. Since the area immediately adjacent the vehicle is the primary concern, if the vehicle is travelling in the forward direction with respect to the upper unit, the operator has good visibility and the alarm is not necessary, and it is desirable to provide a means of manually de-activating the alarm. However, once the vehicle is stopped, the alarm controls should be constructed such that they will automatically restore to their ready condition so that the alarm will again be automatically activated without any attention from the operator when the vehicle is conditioned for travel.

SUMMARY OF THE INVENTION

The present invention is directed to overcoming one or more of the problems as set forth above.

According to the present invention, a travel alarm system for a vehicle includes an electrically energized alarm, an electrical power source, and switching means connected between said power source and said alarm, said switching means being rendered conductive in response to delivery of an electrical signal thereto and being rendered nonconductive in the absence of said electrical signal. A switch is mounted on the vehicle and is connected to the power source, said switch being of a construction sufficient for being moved to a first position automatically in response to the vehicle being conditioned for travel and for being moved to a second postion in response to the vehicle being stopped. A first means is connected to the switch and to the switching means for delivering a first electrical signal to the switching means at the first position of the switch. A second means is connected to the switch and to the switching means for delivering a second electrical signal to the switching means at the first position of the switch. A timer device is connected to the first means for stopping the delivery of the first signal to the switching means only after the first signal has been delivered to the switching means for a predetermined period of time. An override means is connected to the second means for selectively stopping delivery of the second signal to the switching means.

BRIEF DESCRIPTION OF THE DRAWING

The drawing is a schematic diagram of a travel alarm system of this invention.

DETAILED DESCRIPTION OF THE INVENTION

Referring now to the drawing, a travel alarm system for a vehicle is generally indicated by the reference numeral 10 and includes an electrically energized alarm such as a horn 11, and an electrical power source such as a battery 12 having positive and negative terminals 13, 14. A positive line 16 is connected to the positive terminal through a diode 17 which provides reverse polarity protection and a negative or ground line 18 is connected to the negative terminal.

A switching means 19 is provided for connecting the positive line 16 to the alarm 11 to energize or activate the alarm in response to receiving an electrical signal. The alarm is disconnected from the positive line in the absence of the electrical signal. The switching means may include a Darlington amplifier 21 having the collector-emitter circuit of an output transistor 22 connected in series in the positive line between the battery 12 and the alarm. The Darlington amplifier is rendered conductive when the base of a control transistor 23 is grounded and is rendered nonconductive when a positive voltage is applied to the base. A transistor 24 has a collector-emitter circuit connected in series between the base of the control transistor 23 and the ground line 18. A pair of inverters 26 and 27 and a resistor 28 are connected in series between an output terminal 29 of an OR circuit 31 and the base of the transistor 24. The OR circuit has first and second input terminals 32, 33 for receiving first and second electrical signals "A" and "B". Thus, under normal operating conditions when either one or both of the electrical signals "A" and "B" are present at the respective input terminal 32, 33, all three of the transistors 22, 23 and 24 are turned on so that the Darlington amplifier 21 is conductive. With the Darlington amplifier conductive, the horn 11 is activated and emits an audible sound. Conversely, all three transistors are turned off and the Darlington amplifier is rendered nonconductive in the absence of both electrical signals "A" and "B".

A switch 36 is mounted on the vehicle and is connected to the negative line 18. The switch is of a construction sufficient for being moved to a closed position automatically upon conditioning the vehicle for travel and for being moved to an open position when the vehicle is stopped. Such a switch may be a pressure actuated switch connected to a source of fluid which is always pressurized before the vehicle can be moved and is always at substantially atmospheric pressure when the vehicle is stopped. One such system is a spring applied fluid released brake typically provided on many hydraulic excavators. In the present invention, the pressure switch is shown as being connected to a brake actuating conduit, partially shown at 37 of such a spring applied, fluid released brake.

A voltage regulator 38 is serially connected between the positive and negative lines 16 and 18 and includes a resistor 39 and a Zener diode 41 interconnected at a junction 42. The voltage regulator provides a reduced voltage at the junction. A capacitor 43 is connected in parallel with the Zener diode and functions as a filter.

A first means 46 is provided for delivering the first signal "A" to the first input terminal 32 of the OR circuit 31 at the closed position of the switch 36. The first means includes a first switching device such as a flip-flop 47 having data input, output, clocking and reset leads 48, 49, 50 and 51. The data input lead is connected to the junction 42 of the voltage regulator 38. The output lead is connected to the first input terminal 32 of the OR circuit 31. The clocking lead is connected to an output terminal 52 of an "OR" circuit 53. The reset lead is connected to the output terminal 54 of an "OR" circuit 56.

A conductor line 57, a resistor 58, another conductor line 59, an inverter 61 and another conductor line 62 are connected in series between the switch 36 and an input terminal 63 of the OR circuit 53. An inverter 64 is connected in series between the conductor line 62 and an input terminal 66 of the OR circuit 56. The conductor line 57 is connected to the junction 42 of the voltage regulator through a resistor 67.

A second means 68 is provided in substantially parallel relationship to the first means for delivering the second signal "B" to the second input terminal 33 of the OR circuit 31 at the closed position of the switch 36. The second means includes a second switching device, such as a second flip-flop 69, having a data input lead 71 connected to the junction 42 of the voltage regulator, an output lead 72 connected to the second terminal 33 of the OR circuit 31, a clocking lead 73 connected to the conductor line 62 through a resistor 74 and a reset lead 76 connected to the output terminal 77 of an "OR" circuit 78. An input terminal 79 of the OR circuit 78 is connected to the conductor line 65.

Each of the flip-flops 47, 69 is of the type in which the output lead takes on the state of the data input on the transistor of the clock signal from a low to a high potential and the output will go to a low potential in response to receiving a reset signal at the reset lead. Thus, closing the switch 36 causes a signal to be transmitted to the clocking leads 50, 73, causing the output leads 49, 72 to take on the same state as the data input leads 48, 71. This causes the first and second electrical signals "A" and "B" to be transmitted to the first and second terminals 32, 33 of the OR circuit 31.

A timer device 80 has a resistor 81, a conductor line 82 and a capacitor 83 connected in series between the output lead 49 of the flip-flop 47 and the negative line 18. The conductor line 82 is connected to another input terminal 84 of the OR circuit 56. The conductor line 82 is also connected to the conductor line 62 through diode 86.

An override means 87 is connected to the second means 68 for selectively stopping delivery of the second signal B to the switching means 19. The override means includes a manual switch 88, a conductor line 89, a resistor 91, and an inverter 92 connected in series between the negative line 18 and another input terminal 93 of the OR circuit 78. The conductor line 89 is connected to the junction 42 through a resistor 94.

An overload or short circuit protective device 100 is provided to render the Darlington amplifier 21 nonconductive if the horn goes bad. The device includes an enabling circuit having the base of a transistor 101 connected to the conductor line 59 through a resistor 102 and an inverter 103 so that the transistor 101 is turned on when the switch 36 is closed. If the horn goes bad, excess current will flow through a pair of resistors 104 and 106 connected to the positive line 16 between the positive terminal 13 and the Darlington amplifier. This causes an increased voltage drop across the resistors and the anode of a diode 107 goes more negative with respect to the positive line to establish the bias at the base of a transistor 108 sufficiently lower than the emitter voltage of the transistor 108 thereby turning it on.

When the transistor 108 is on, the base of another transistor 109 is connected to the positive line and the transistor 109 will turn off. This removes the positive clamp on the base of transistor 110 which is then grounded through the collector-emitter circuit of transistor 101. The transistor 110 therefore turns on and positive voltage appears at the base of the control transistor 23 of the Darlington amplifier causing both transistors 22 and 23 to turn off de-energizing the horn. The protective circuit thereby also protects the Darlington amplifier circuit from excessive current.

As long as the switch 36 remains closed, the transistor 101 will remain on to latch the transistor 110 on and the Darlington amplifier can not turn on to re-energize the horn. If the switch 36 is opened, the transistor 101 will turn off to remove the latch on the transistor 110 and the entire circuit restores to the original state. If the switch 36 is again closed with the horn shorted, the above sequence immediately repeats to remove power from the horn.

In operation, the act by the operator of conditioning the vehicle for travel, i.e., releasing the brakes by directing pressurized fluid through the conduit 37, causes the switch 36 to be closed. Closing switch 36 causes the electrical signals "A" and "B" to be delivered to the input terminals 32 and 33 of the OR circuit 31. With a signal present at either of the input terminals of the OR circuit, the Darlington amplifier 21 is rendered conductive thereby energizing the horn 11.

The electrical signal "A" at the input terminal 32 also starts to charge the capacitor 83 of the timer device 80. After a predetermined period of time as determined by the RC network of the timer device, which in this case is approximately 15 seconds, the capacitor becomes charged sufficiently for the electrical signal to then pass through the input terminal 84 of the OR circuit 56 and to the reset lead 51 of the first flip-flop 47. As previously stated, the electrical potential at the output lead 49 goes low when a signal is directed to the reset lead. Thus, the electrical signal "A" is removed from the input terminal 32. However, the signal "B" is still present at the terminal 33 and thus the Darlington amplifier 21 remains conductive and the horn 11 energized.

If the operator wishes to de-energize the horn 11 after it has been activated for the predetermined period of time of the timer device 80, he may selectively close the switch 88 causing a signal to be directed to the reset lead 76 of the second flip-flop 69, thereby causing the output lead 72 to go to a low electrical potential. This removes the electrical signal "B" from the input terminal 33 of the OR circuit 31. With neither signal "A" or "B" present at the terminals 32 or 33, the Darlington amplifier 21 is rendered nonconductive and the horn is de-energized.

Opening the switch 36 such as when the vehicle is stopped and the fluid pressure in the conduit 37 relieved, at any time in the above sequence will cause the charge retained by the capacitor 83 to discharge rapidly through the diode 86 and the inverter 61 to the battery 12. Likewise, a signal will be directed to the reset leads 51, 76 of the flip-flops 47, 69 so that the output leads 49, 72 go to a low electrical potential. Thus, if the vehicle is again started the horn 11 will be energized for at least the time of the timer device 80.

The embodiments of the invention in which an exclusive property or privilege is claimed are defined as follows:

1. A alarm system comprising:

an electrically energized alarm (11);
an electrical power source (12);
switching means (19) connected between said power source and said alarm, said switching means being of the type rendered conductive for energizing said alarm in response to delivery of at least one electrical signal thereto and being rendered nonconductive for deenergizing said alarm in the absence of such an electrical signal;
a switch (36) connected to the power source, and being movable between first and second positions;
first means (46) connected to the switching means for delivering a first electrical signal to the switching means at the first position of the switch;
second means (68) connected to the switching means for delivering a second electrical signal to the switching means at the first position of the switch, said second electrical signal being separate from and independent of said first electrical signal;
timer means (80) for stopping the delivery of the first signal to the switching means only after the first signal has been delivered to the switching means for a predetermined period of time; and
manual override means (87) for manually selectively stopping delivery of the second signal to the switching means.

2. The alarm system of claim 1 wherein the first means includes a switching device (47) having an input lead (48), an output lead (49), a clocking lead (50), and a reset lead (51), said means includes a switching device (60) having an input lead (71), an output lead (72), a clocking lead (73), and a reset lead (76), said output leads being connected to the switching means, said clocking leads being connected to the switch, said reset lead (51) being connected to the timer means, and said second reset (76) lead being connected to the manual override means, each of the switching devices being of the type in which the output lead takes on the state of the input lead in response to initially receiving a rising electrical signal at the clocking lead and in which the output lead takes on a low electrical potential in response to receiving an electrical signal at the reset lead.

3. The alarm system of claim 2 wherein said power source has a positive terminal and a negative terminal, said input leads being connected to the positive terminal.

4. The alarm system of claim 3 wherein said timer device includes a resistor (81), a connector line (82), and a capacitor (83) connected in series between the output lead (48) and the negative terminal, and means (56) for connecting the connector line (82) to the reset lead (51).

5. The alarm system of claim 4 wherein the means (56) includes a "OR" circuit (56) having an output terminal (54) and first and second input terminals (84,66), said output terminal being connected to the reset lead (51), and said first input terminal being connected to said connector line (82).

6. The alarm system of claim 5 wherein said manual override means includes a "OR" circuit (78) having an output terminal (77) and first and second input terminals (93,79) with said output terminal being connected to the reset lead (76); a switch (88), a connector line (89), and an inverter (92) connected in series between the negative terminal and the first input terminal of the "OR" circuit (78); and means (94) for connecting the connector line (89) to the positive terminal.

7. The alarm system of claim 6 wherein said switch (36) is connected to the negative terminal and including a connector line (57), an inverter (61), and a connector line (62) connected in series between the switch (36) and each of the clocking leads, an inverter (64) connected in series between the connector line (62) and each of the second input terminals of the "OR" circuits, and means (67) for connecting the positive terminal to the connector line (57).

8. The alarm system of claim 7 including a voltage regulator means (38) serially connected between the positive and negative terminals for reducing the voltage to the input leads and to the means (94) and the means (67).

9. The alarm system of claim 8 wherein said means (94) includes a resistor (94) connected in series between the voltage regulator means and the conductor line (89), and said means (67) includes a resistor (67) connected in series between the voltage regulator means and the conductor line (57).

10. The alarm system of claim 9 wherein said switching means includes a Darlington amplifier (21) connected in series between the positive terminal and the alarm; a "OR" circuit (31) having first and second input terminals (32,33) and an output terminal (29), said first and second input terminals (32,33) being connected to the respective output leads; and means for connecting the output terminal (29) to the Darlington amplifier.

11. The alarm of claim 10 wherein said means for connecting the output terminal to the Darlington amplifier includes a transistor (24) having a collector-emitter circuit connected in series between the Darlington amplifier and the negative terminal and a pair of inverters (26,27) connected in series between the output terminal of the "OR" circuit (31) and a base of the transistor.

12. The alarm system of claim 1, for mounting on a vehicle, wherein said switch is mounted on the vehicle, said switch being of a construction sufficient for being automatically moved to the first position in response to the vehicle being conditioned for travel and for being moved to the second position in response to the vehicle being stopped.

13. The alarm system of claim 12 including means connected to said first and second means for stopping the delivery of the frist and second signals at the second position of the switch.

14. The alarm of claim 13 wherein said switch is a pressure switch of the type which is moved to the first position in response to receiving fluid pressure and is moved to the second position in response to an absence of fluid pressure.

* * * * *